United States Patent
Baker et al.

(10) Patent No.: US 7,116,978 B2
(45) Date of Patent: Oct. 3, 2006

(54) METHOD FOR CONFORMANCE TESTING OF RADIO COMMUNICATION EQUIPMENT

(75) Inventors: Matthew P. J. Baker, Canterbury (GB); Timothy J. Moulsley, Caterham (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 127 days.

(21) Appl. No.: 10/931,832

(22) Filed: Sep. 1, 2004

(65) Prior Publication Data

US 2005/0037761 A1    Feb. 17, 2005

Related U.S. Application Data

(63) Continuation of application No. 09/710,832, filed on Nov. 13, 2000, now Pat. No. 6,804,512.

(30) Foreign Application Priority Data

Nov. 27, 1999  (GB) ................................. 9927995.2

(51) Int. Cl.
  *H04Q 7/20* (2006.01)
(52) U.S. Cl. ........................ 455/423; 455/442; 455/522
(58) Field of Classification Search ................ 455/423, 455/522, 69, 442–443, 432.1; 370/318, 332, 370/333, 311, 328–329
See application file for complete search history.

(56) References Cited

U.S. PATENT DOCUMENTS

| | | | |
|---|---|---|---|
| 5,924,043 A | 7/1999 | Takano | 455/522 |
| 6,081,714 A * | 6/2000 | Wakizaka | 455/437 |
| 6,351,651 B1 | 2/2002 | Hamabe et al. | 455/522 |
| 6,603,746 B1 * | 8/2003 | Larijani et al. | 455/69 |
| 6,603,773 B1 | 8/2003 | Laakso et al. | 370/441 |
| 6,611,690 B1 | 8/2003 | Moulsley et al. | 455/522 |
| 6,708,041 B1 * | 3/2004 | Butovitsch et al. | 455/522 |
| 2001/0011024 A1 * | 8/2001 | Lundby et al. | 455/522 |
| 2001/0055968 A1 * | 12/2001 | Yoshida et al. | 455/436 |
| 2002/0034957 A1 * | 3/2002 | Baker et al. | 455/442 |
| 2002/0039902 A1 | 4/2002 | Baker et al. | 455/436 |
| 2002/0058481 A1 * | 5/2002 | Mohebbi | 455/67.1 |
| 2002/0094834 A1 | 7/2002 | Baker et al. | 455/522 |
| 2002/0141377 A1 | 10/2002 | Baker et al. | 370/349 |
| 2003/0195012 A1 | 10/2003 | Baker et al. | 455/522 |

* cited by examiner

*Primary Examiner*—Joseph Feild
*Assistant Examiner*—Kamran Afshar

(57) ABSTRACT

The invention provides a method of conformance testing of a secondary station for use in a radio communication system which permits a soft handover process in which the secondary station engages in communication with a plurality of primary stations. The method permits testing the response of the secondary station to power control commands received simultaneously from each of the plurality of primary stations instructing it to adjust its output transmission power. In particular, the method enables testing the secondary station's assessment of the reliability of the power control commands received from each primary station, which has not been possible previously.

The test is performed by transmitting known sequences of power control commands to the secondary station from each of the primary stations, then comparing the actual pattern of changes in output transmission power with the expected pattern of changes.

17 Claims, 2 Drawing Sheets

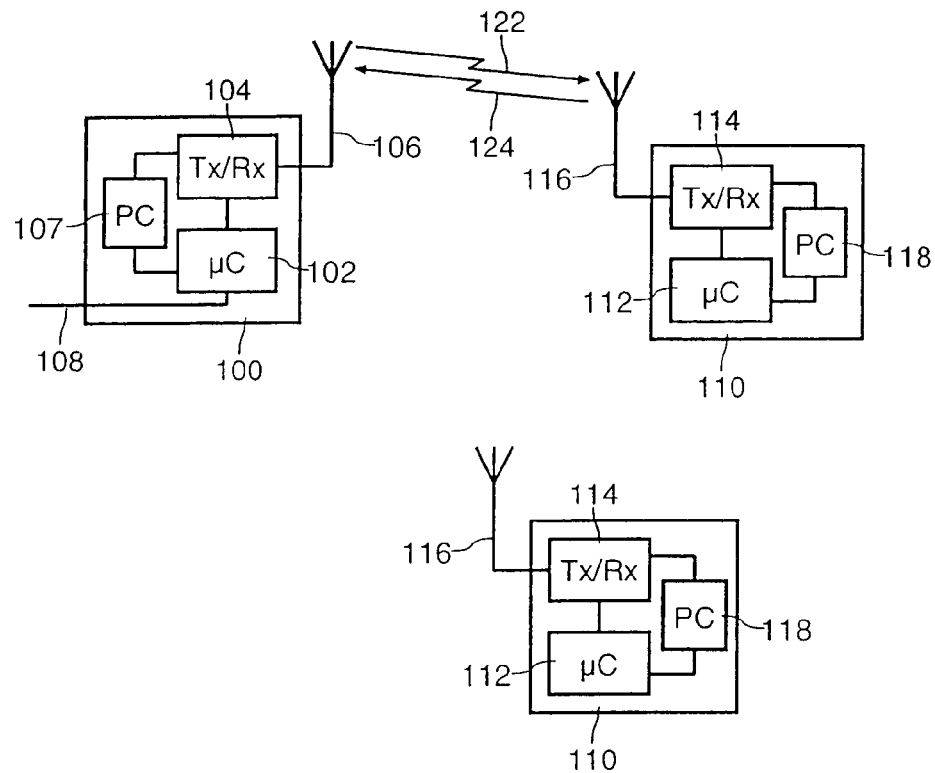
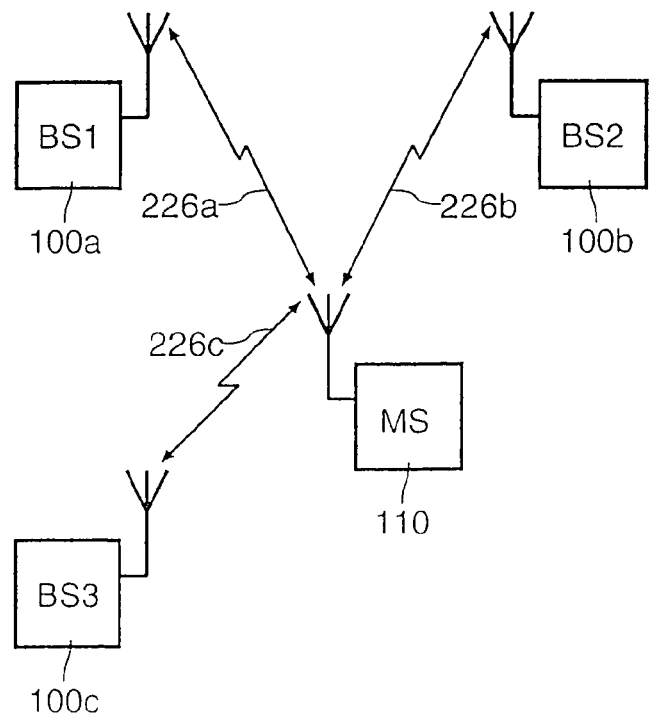

METHOD FOR CONFORMANCE TESTING OF RADIO COMMUNICATION EQUIPMENT

CROSS REFERENCE TO RELATED APPLICATION

This is a continuation of prior application Ser. No. 09/710,832 filed Nov. 13, 2000 now U.S. Pat. No. 6,804,512.

The present invention relates to a method of conformance testing of a radio communication system during soft handover, and to a radio test equipment for carrying out the method. While the present specification describes the method with particular reference to the emerging Universal Mobile Telecommunication System (UMTS), it is to be understood that such techniques are equally applicable to use in testing equipment for other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many radio communication systems accurate power control is important. This is particularly so in systems employing spread spectrum Code Division Multiple Access (CDMA) techniques, because many communication channels share the same bandwidth and so transmission at too high a power in any one channel reduces the signal to noise ratio in all the other channels. Uplink power control, of signals transmitted to a Base Station (BS) from a Mobile Station (MS), is particularly important. It ensures that the BS receives signals from different MSs at approximately the same power level, while minimising the transmission power required by each MS. Downlink power control, of signals transmitted by the BS to a MS, is required so that the MS receives signals from the BS with a low error rate while minimising transmission power, to reduce interference with other cells and radio systems.

In a UMTS embodiment, power control is normally operated in a closed loop manner. For uplink power control the BS determines the required changes in the power of transmissions from a MS and signals these changes to the MS by means of Transmit Power Control (TPC) commands. To minimise overheads, a TPC command typically instructs the MS to increase or decrease its power, with the change in power being a step of predetermined size. However, in some systems a TPC command may also determine the step size to be used.

A MS generally communicates with a single BS. During the course of a call the MS may wish to investigate transferring to another BS, for example when the quality of the communication link deteriorates as the MS moves away from its BS, or when the relative traffic loading of different cells requires adjusting. The process of transferring from one BS to another is known as handover. In a version of this process known as soft handover, the MS engages in communication with a plurality of BSs (known as the "active set" of BSs) to determine to which BS, if any, it should transfer. When the MS is engaged in this process, it will receive TPC commands from each of the BSs at substantially the same time. It must therefore have an algorithm for determining how to handle a plurality of TPC commands, which may be conflicting.

In one algorithm, which must be supported by a MS suitable for use in a UMTS system, the MS assesses the reliability of the TPC command from each BS when deciding how to adjust its transmission power. Methods for performing this assessment include measuring the Signal-to-Interference Ratio (SIR) of the received TPC commands, measuring the SIR of other symbols within the same timeslot (for example pilot symbols), and measuring the actual received signal amplitude of the TPC bits before decoding, a function of which amplitudes may be known as Soft Symbol Information (SSI).

To determine whether a MS is suitable for use in a particular communication system, such as UMTS, it must undergo conformance tests to determine whether its operation complies with the relevant standards. In such a conformance test to analyse whether a MS is correctly processing TPC commands while performing a soft handover, it is difficult to access the result of the MS's estimation of SIR or SSI. Hence it is difficult to assess whether the MS's behaviour is correct.

An object of the present invention is to provide a method of conformance testing of radio communication equipment during soft handover which addresses the above problem. A further object of the present invention is to enable the required behaviour of radio communication equipment during soft handover to be specified.

According to a first aspect of the present invention there is provided a method for conformance testing of a secondary station for use in a radio communication system, the secondary station having means for engaging in a soft handover process in which it communicates with at least two primary stations simultaneously and also having power control means for adjusting its output transmission power in response to power control commands received from each of the at least two primary stations, the method comprising operating in a test equipment the steps of:

generating and transmitting to a secondary station under test at least two signals equivalent to those transmitted by each of the at least two primary stations, each signal including a sequence of power control commands;

monitoring the output transmission power of the secondary station; and determining whether a function of the output transmission power is within its specified tolerance.

According to a second aspect of the present invention there is provided a radio test equipment for conformance testing of a secondary station for use in a radio communication system, the test equipment being adapted to carry out the test method according to a first aspect of the present invention.

By means of the present invention there is provided a method of conformance testing of a MS processing TPC commands during soft handover.

Embodiments of the present invention will now be described, by way of example, with reference to the accompanying drawings, wherein:

FIG. 1 is a block schematic diagram of a radio communication system;

FIG. 2 is a block schematic diagram of a radio communication system with a MS in the process of soft handover.

In the drawings the same reference numerals have been used to indicate corresponding features.

Figure 3:
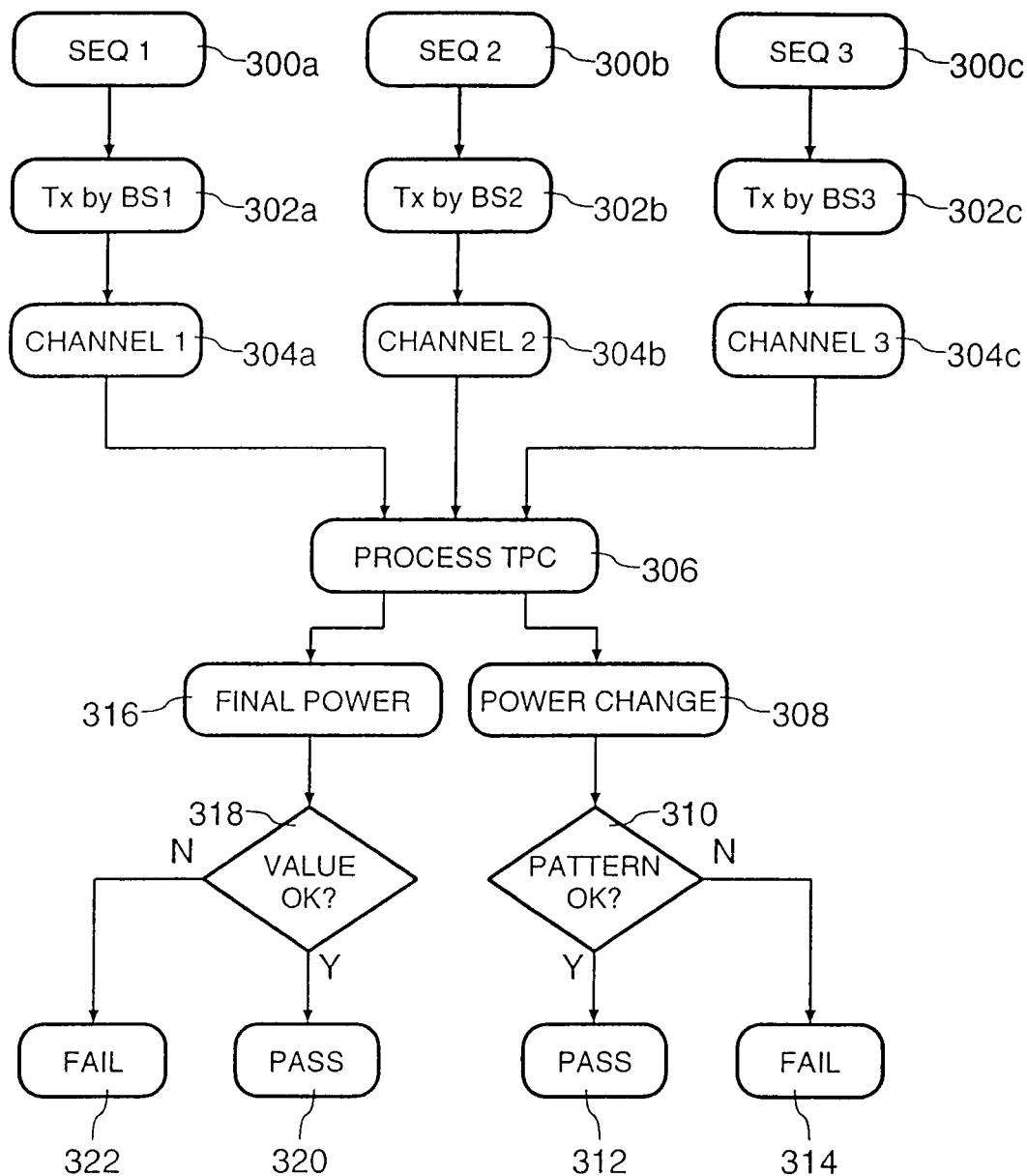
FIG. 3 is a flow chart illustrating a method of conformance testing of radio communication equipment during soft handover in accordance with the present invention.

Referring to FIG. 1, a radio communication system comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from BS 100 to MS 110 takes place on a downlink frequency channel 122, while communication from MS 110 to BS 100 takes place on an uplink frequency channel 124.

A MS 110 engaged in a soft handover process is illustrated in FIG. 2, the MS 110 having three two-way communication channels 226a, 226b, 226c with three respective BSs 100a, 100b,100c. In a given time slot the MS 110 receives substantially simultaneously three TPC commands, one from each of BSs 100a,100b,100c. According to one example of a method of processing these TPC commands, the MS 110 measures the SSI for each of the three TPC commands, and compares the magnitude of each SSI with a predetermined threshold. If the magnitude if the SSI is above the threshold the associated TPC command is deemed to be reliable, otherwise the TPC command is deemed to be unreliable.

One example of a method for combining the TPC commands in the given time slot is for the MS 110 to reduce its transmitted power if one of the TPC commands in the time slot is deemed reliable and is interpreted as "down", or if all of the TPC commands in the time slot are deemed unreliable and are interpreted as "down". Otherwise the MS 110 will increase its transmission power.

A method of conformance testing of a MS 110 in accordance with the present invention uses n sequences of TPC commands, where n is the number of BSs 100 to be used for the soft handover conformance test. FIG. 3 is a flow chart illustrating the steps in such a test performed using three BSs 100.

The method begins with the generation, at steps 300a to 300c, of one sequence of TPC commands for each BS 100 to be used in the soft handover conformance test (three in this example). The TPC sequences may be designed so that any particular set of three simultaneous TPC commands (e.g. 0, 1, 0) will occur a significant number of times, N, during the course of the test. For example, a suitable value of N could be about 20, in order to provide sufficient samples for a statistically meaningful result. It is not necessary for all possible combinations of TPC commands to be used in such a sequence. As an alternative, a shorter TPC sequence including one or more possible combinations of TPC commands could be transmitted N times. As a further alternative, the TPC sequences may be pseudo-random.

At steps 302a to 302c each BS 100a,100b,100c simultaneously transmits its respective sequence of TPC commands, which transmissions pass through respective radio channels 304a,304b,304c which distort the transmitted signals and add noise. Typically the channels will have predetermined characteristics and the combined signals will be fed directly into the antenna input of the MS 110. If the channels do not include noise it should be added, preferably as Additive White Gaussian Noise (AWGN). This ensures a representative spread of amplitudes for the received TPC commands and hence a representative spread of SSI or SIR values. The level of noise added should be such that, in combination with the channel modeller used, the error rate of received TPC commands is for example no worse than 10%.

The sequences are received by the MS 110 which, after each triplet of TPC commands has been received together, processes them, at step 306, to determine what change in power level should be made. Changes in the transmission power output of the MS 110 are monitored, at step 308. When the complete sequence of TPC commands has been received a first test is performed in which the pattern of power changes generated by the MS 110 is compared, at step 310 with the expected pattern of power changes. If the pattern is acceptable this aspect of the test is passed, step 312, if not it is failed, step 314.

The acceptability of the actual pattern of power control changes would be judged by determining, for each of the N identical sets of transmitted TPC commands (or for the complete sequence of sets), the proportion P of these sets for which the MS 110 responds in a particular way. If the value of P is greater than a predetermined value, then it appears that the MS 110 is correctly carrying out the SIR or SSI estimation, and the test is passed. A suitable value for P may depend on the error rate of the received TPC commands and the number of BSs 100. For the example of a worst-case error rate of 10% and three BSs 100, a suitable value of P could be about 70%.

The acceptable value of P could be set at different levels for different sets or groups of sets of TPC commands. For example, the probability of a set of TPC commands being interpreted correctly may be a function of the particular commands within the set, which function may depend on the method used for combining the TPC commands from a set. For example, the proportion P of the sets containing TPC commands [1,1,1] which are interpreted correctly might take one value $P_1$, while the proportion of the sets [1,1,0], [1,0,1] and [0,1,1] which are interpreted correctly might take another value $P_2$, the proportion of the sets [0,0,1], [0,1,0] and [1,0,0] which are interpreted correctly might take a third value $P_3$ and the proportion of the sets [0,0,0] which are interpreted correctly might take a fourth value $P_4$.

A further test may be performed in addition to or instead of the first test. When the complete sequence of TPC commands has been received this test determines, at step 316, the final output power of the MS 110. This power is tested, at step 318, to see if it is within a predetermined range relative to the output power at the start of the test. If it is then this aspect of the test is passed, step 320, if not it is failed, step 322.

As an example of how an acceptable range of powers may be determined, consider the case where $n_u$ sets of TPC commands are transmitted, each of which sets should be interpreted as "up" after the MS 110 has performed its combination process. For example, with a worst-case error rate of received TPC commands from each BS 100a,100b, 100c of 5%, at least 85% of the sets of commands should be interpreted correctly by the MS 110. Hence, the expected power change from these sets of TPC commands is $(0.85\pm0.15)n_u(\Delta_{TPC}\pm\delta_A)$, where $\Delta_{TPC}$ is the power control step size used by the MS 110 and $\delta_A$ is the tolerance in the power control step size (assessed by a separate test). Similarly, if $n_d$ sets of TPC commands are transmitted, each of which sets should be interpreted as "down" after the combination process, the expected power change is $-(0.85\pm0.15)n_d(\Delta_{TPC}\pm\delta_A)$. Hence, the total expected power change by the end of the test is $$(0.85\pm0.15)(n_u-n_d)(\Delta_{TPC}\pm\delta_A)$$

This latter test is most likely to be useful where there is a low TPC error rate, a small number of BSs 100 and a significant difference between the values of $n_u$ and $n_d$. These conditions will result in the total expected power change being a significant number of step sizes and having a relatively small expected tolerance.

In the description above a plurality of BSs 100 were used generate and transmit signals to the MS 110. However, in a practical test system such signals could equally well be generated by a Radio Frequency (RF) signal generator forming part of the test system.

The present invention has been described in relation to the testing of a MS suitable for use in a UMTS embodiment. However, it is generally applicable to any system employing closed loop power control where commands are received from multiple base stations simultaneously and the resulting action may be dependent on properties of the commands which are untestable because they are determined internally by the equipment under test.

From reading the present disclosure, other modifications will be apparent to persons skilled in the art. Such modifications may involve other features which are already known in methods of conformance testing of radio communication equipment, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A test method for conformance testing of a secondary station engaging in a soft handover testing process in which the secondary station communicates with a primary station whereby an output transmission power of the secondary station is adjustable in response to power control commands received by the secondary station from the primary station, the test method comprising:
receiving a one or more test signals from the primary station, each test signal including a sequence of power commands, wherein each sequence of power commands in the one or more test signals is arranged to establish a particular combination of power control commands that occurs a plurality of times during the reception of the plurality of test signals by the secondary station;
adjusting and monitoring the output transmission power of the secondary station based on the one or more test signals received from the primary station; and
determining whether a function of the output transmission power of the secondary station is within a specified tolerance associated with the secondary station.

2. The test method of claim 1, wherein the function of the output transmission power is a sequence of changes of the output transmission power based on the one or more test signals received from the primary station.

3. The test method of claim 1, wherein the specified tolerance is a function the one or more test signals received from the primary station.

4. The test method of claim 1, wherein the function of the output transmission power is a difference between a first level of the output transmission power prior to receiving the one or more test signals received from the primary station and a second level of the output transmission power subsequent to adjusting and monitoring the output transmission power of the secondary station based on the one or more test signals received from the primary station.

5. The test method of claim 1, wherein the secondary station uses an estimate of a reliability of the one or more test signals received from the primary station in determining a required change in the output transmission power.

6. The test method of claim 1, wherein the sequence of power control commands in each test signal is pseudo-random.

7. The test method of claim 1, wherein each sequence of power control commands is arranged to establish a sub-sequence of power control commands that occurs a one or more times during the reception of the one or more of test signals by the secondary station.

8. The test method of claim 1, wherein the secondary station simultaneously receives the one or more test signals from the primary station.

9. A secondary station engaging in a soft handover test process in which the secondary station communicates with a primary station whereby an output transmission power of the secondary station is adjustable in response to power control commands received by the secondary station from the primary station, the secondary station comprising:
a transceiver capable of receiving one or more test signals from the primary station, each test signal including a sequence of power commands, wherein the sequences of power commands at least establish a particular combination of power control commands, which combination occurs one or more times during the reception of the one or more test signals by the secondary station;
a power controller in electrical communication with the transceiver, wherein the power controller is operable to adjust the output transmission power based on the one or more test signals received from the primary station; and
a microcontroller in electrical communication with the transceiver and the power controller,
wherein the microcontroller is operable to monitor an adjustment of the output transmission power by the power controller based on the one or more test signals received from the primary station, and wherein the microcontroller is further operable to determine whether a function of the output transmission power is within a specified tolerance associated with the secondary station.

10. The secondary station of claim 9, wherein the function of the output transmission power is a sequence of changes of the output transmission power based on the one or more test signals received from the primary station.

11. The secondary station of claim 9, wherein the specified tolerance is a function of the one or more test signals received from the primary station.

12. The secondary station of claim 9, wherein the function of the output transmission power is a difference between a first level of the output transmission power prior to receiving the one or more of test signals from the primary station and a second level of the output transmission power subsequent to adjusting and monitoring the output transmission power of the secondary station based on the one or more test signals received from the primary station.

13. The secondary station of claim 9, wherein the microcontroller uses an estimate of a reliability the one or more test signals received from the primary station in determining a required change in the output transmission power.

14. The secondary station of claim 9, wherein the sequence of power control commands in each test signal is pseudo-random.

15. The secondary station of claim 9, wherein the particular combination of power control commands is a subsequence of power control commands.

16. The secondary station of claim 9, wherein the transceiver simultaneously receives the one or more test signals from the primary station.

17. A secondary station engaging in a soft handover test process in which the secondary station communicates with a primary station whereby an output transmission power of the secondary station is adjustable in response to power control commands received by the secondary station from the primary station, the secondary station comprising:

means for receiving a one or more test signals from the primary station, each test signal including a sequence of power commands;

means for adjusting and monitoring the output transmission power of the secondary station based on the one or more test signals received from the primary station; and means for determining whether a function of the output transmission power of the secondary station is within a specified tolerance associated with the secondary station.

* * * * *